(12) United States Patent
Bullard et al.

(10) Patent No.: US 10,451,216 B2
(45) Date of Patent: Oct. 22, 2019

(54) METHOD AND APPARATUS FOR MULTIPLE DEGREE OF FREEDOM PRECISION ADJUSTABLE MOUNT

(71) Applicant: RAYTHEON COMPANY, Waltham, MA (US)

(72) Inventors: Andrew L. Bullard, Manhattan Beach, CA (US); Alexander Richa K. Raco, Lawndale, CA (US)

(73) Assignee: Raytheon Company, Waltham, MA (US)

( * ) Notice: Subject to any disclaimer, the term of this patent is extended or adjusted under 35 U.S.C. 154(b) by 547 days.

(21) Appl. No.: 14/836,709

(22) Filed: Aug. 26, 2015

(65) Prior Publication Data

US 2017/0059085 A1    Mar. 2, 2017

(51) Int. Cl.
| | |
|---|---|
| F16B 35/00 | (2006.01) |
| F16M 13/02 | (2006.01) |
| G02B 7/00 | (2006.01) |
| G02B 7/182 | (2006.01) |

(52) U.S. Cl.
CPC ............. *F16M 13/02* (2013.01); *G02B 7/004* (2013.01); *G02B 7/1825* (2013.01); *F16B 35/005* (2013.01)

(58) Field of Classification Search
USPC ............................................ 411/393; 403/87
See application file for complete search history.

(56) References Cited

U.S. PATENT DOCUMENTS

| | | | |
|---|---|---|---|
| 3,063,312 A * | 11/1962 | Mueller ................ | B23B 51/108 408/191 |
| 3,094,022 A * | 6/1963 | Young ................ | B25B 13/5016 81/176.1 |
| 3,152,818 A * | 10/1964 | Ivins ..................... | E05B 1/0015 16/422 |
| 4,772,109 A | 9/1988 | Cutburth | |
| 4,912,809 A * | 4/1990 | Scheuer ................ | E05B 1/0015 16/413 |
| 5,123,310 A * | 6/1992 | McManus .............. | B25B 13/06 81/121.1 |
| 5,249,197 A | 9/1993 | Kittell | |

(Continued)

FOREIGN PATENT DOCUMENTS

| | | |
|---|---|---|
| JP | 11-084195 A | 3/1999 |
| JP | 2002-014286 A | 1/2002 |

OTHER PUBLICATIONS

Notification of Transmittal of the International Search Report and the Written Opinion of the International Searching Authority, or the Declaration dated Oct. 10, 2016 in connection with International Patent Application No. PCT/US2016/039439.

(Continued)

*Primary Examiner* — Alfred J Wujciak

(57) ABSTRACT

An apparatus configured for precision adjustment includes a support fitting having a void oriented along a first axis. The apparatus also includes an adjustment screw disposed within the void. The apparatus further includes first and second set screws coupled to the support fitting, where each set screw has a substantially conical tip. The first and second set screws are oriented such that a plane bisecting the first and second set screws is substantially perpendicular to the first axis. An edge of the conical tip of the first set screw is substantially parallel to an edge of the conical tip of the second set screw.

20 Claims, 6 Drawing Sheets

(56) References Cited

U.S. PATENT DOCUMENTS

| | | | |
|---|---|---|---|
| 5,757,561 A | 5/1998 | Sechrist | |
| 7,219,582 B2* | 5/2007 | Ito | B25B 13/485 |
| | | | 81/121.1 |
| 7,473,082 B2* | 1/2009 | Marielle | F01C 17/06 |
| | | | 403/362 |

OTHER PUBLICATIONS

Office Action dated Jan. 22, 2019 in connection with counterpart Japanese Patent Application No. 2018-502407, 8 pages.
Office Action dated Aug. 6, 2019 in connection with Japanese Patent Application No. 2018-502407, 6 pages.

* cited by examiner

__US 10,451,216 B2__

METHOD AND APPARATUS FOR MULTIPLE DEGREE OF FREEDOM PRECISION ADJUSTABLE MOUNT

TECHNICAL FIELD

This disclosure is directed in general to devices that are adjustable in multiple degrees of freedom. More specifically, this disclosure relates to a method and apparatus for a multiple degree of freedom precision adjustable mount.

BACKGROUND

Many devices need to be adjustable across many positions and multiple degrees of freedom. For example, hardware used in a focal plane assembly may need to have an adjustable position and orientation. Similarly, many devices used in meteorological and surveillance satellites, other optical systems, and missile systems require adjustable positions. A number of devices allowing multi-degree-of-freedom adjustability have been developed. However, many of these devices require multiple precision stages for each degree of freedom, which adds weight and reduces the viability for use in a flight system. Also, in some cases, external tooling is required to provide precision adjustments.

SUMMARY

This disclosure provides a method and apparatus for a multiple degree of freedom precision adjustable mount.

In a first embodiment, an apparatus includes a support fitting having a void oriented along a first axis. The apparatus also includes an adjustment screw disposed within the void. The apparatus further includes first and second set screws coupled to the support fitting, where each set screw has a substantially conical tip. The first and second set screws are oriented such that a plane bisecting the first and second set screws is substantially perpendicular to the first axis. An edge of the conical tip of the first set screw is substantially parallel to an edge of the conical tip of the second set screw.

In a second embodiment, a system includes first and second support fittings, where each support fitting has a void oriented along a first axis. Each support fitting includes an adjustment screw disposed within the respective void. Each support fitting also includes first and second set screws coupled to the respective support fitting. Each set screw has a substantially conical tip. The first and second set screws are oriented such that a plane bisecting the first and second set screws is substantially perpendicular to the first axis. An edge of the conical tip of the first set screw is substantially parallel to an edge of the conical tip of the second set screw. The first and second set screws coupled to the first support fitting are oriented in a pattern that is a mirror image of the first and second set screws coupled to the second support fitting.

In a third embodiment, a method includes adjusting a position along a first axis of an adjustment screw disposed within a void of a support fitting oriented along the first axis. The method also includes adjusting a position of each of first and second set screws coupled to the support fitting, where each set screw has a substantially conical tip. The first and second set screws are oriented such that a plane bisecting the first and second set screws is substantially perpendicular to the first axis. An edge of the conical tip of the first set screw is substantially parallel to an edge of the conical tip of the second set screw.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 5, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Adjustable devices that are suitable for use in stable environments (such as a lab) may not be acceptable in environments subject to significant accelerative forces (such as thirty times gravitational acceleration or "30 Gs") or vibrations. For example, a locking mechanism for a mount that relies on friction might have enough holding force in a stable stationary environment but may lack sufficient holding force in such a dynamic environment.

Likewise, some mounting systems are difficult to accurately and precisely adjust. For example, some systems have adjustment mechanisms that are not sensitive to fine adjustments. As a particular example, in one type of system, multiple incremental fine adjustments (1-2 mils) may have no effect on the position of the system but instead may build up strain forces in the system. One subsequent fine adjustment may then cause the entire system to succumb to the increasing strain forces of the earlier adjustments and suddenly shift or jump a large amount (>10 mils).

To address these or other issues, embodiments of this disclosure provide a multiple degree-of-freedom adjustable and lockable mount that allows for all in-plane degrees of freedom to be adjusted using one tool. The adjustments can be made in all degrees of freedom, even in systems that provide limited or no access on certain sides. The adjustments can also be performed with smooth linear operation. The adjustments are lockable after a final position and orientation are reached without a locking mechanism perturbing the position and orientation of the adjusted element. The disclosed embodiments are provided with a simple, low-cost implementation.

It will be understood that embodiments of this disclosure may include any one, more than one, or all of the features described here. In addition, embodiments of this disclosure may additionally or alternatively include other features not listed here.

Figure 1A:
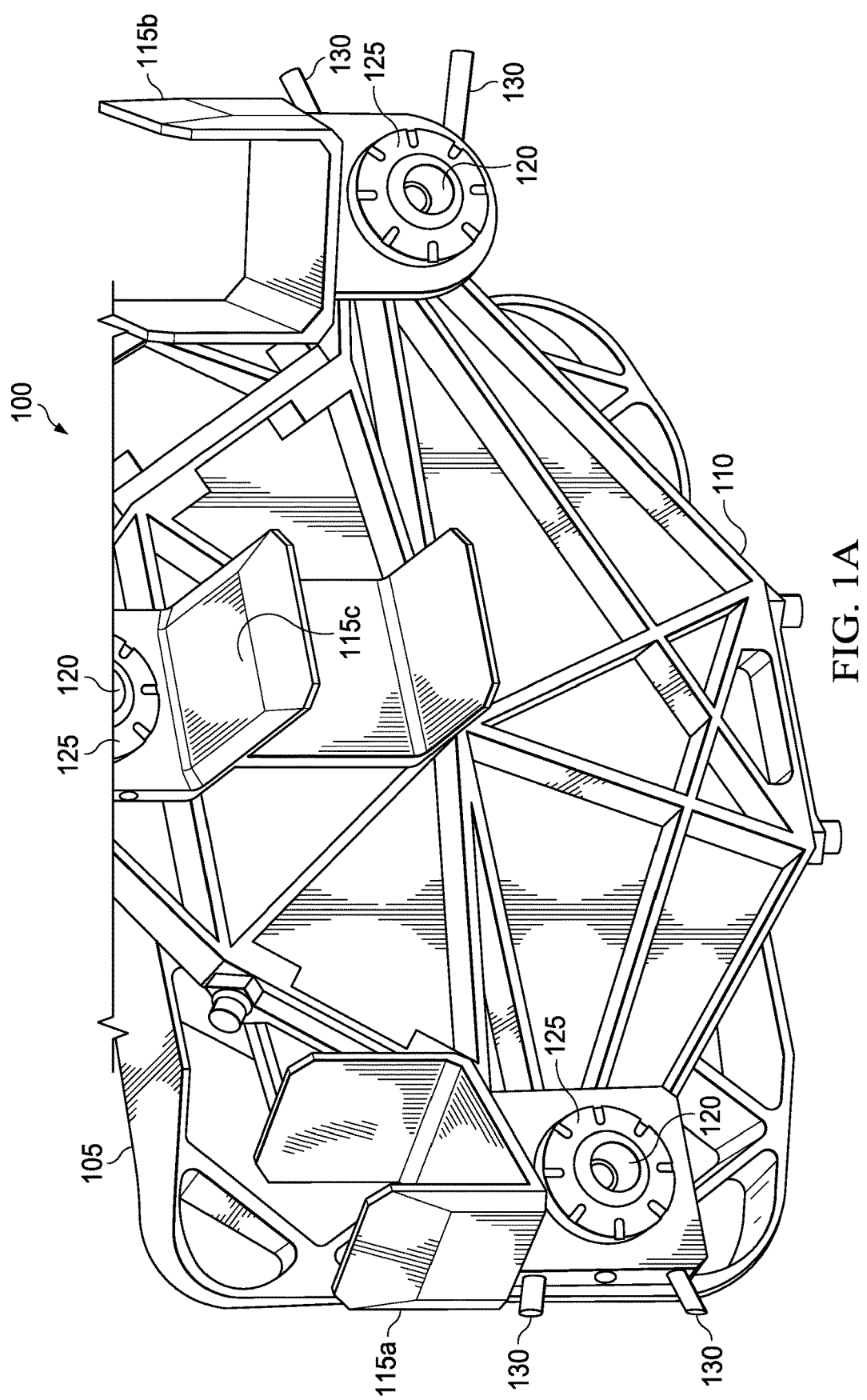
FIGS. 1A and 1B illustrate views of an example precision adjustable mounting system according to this disclosure.
Figure 1B:
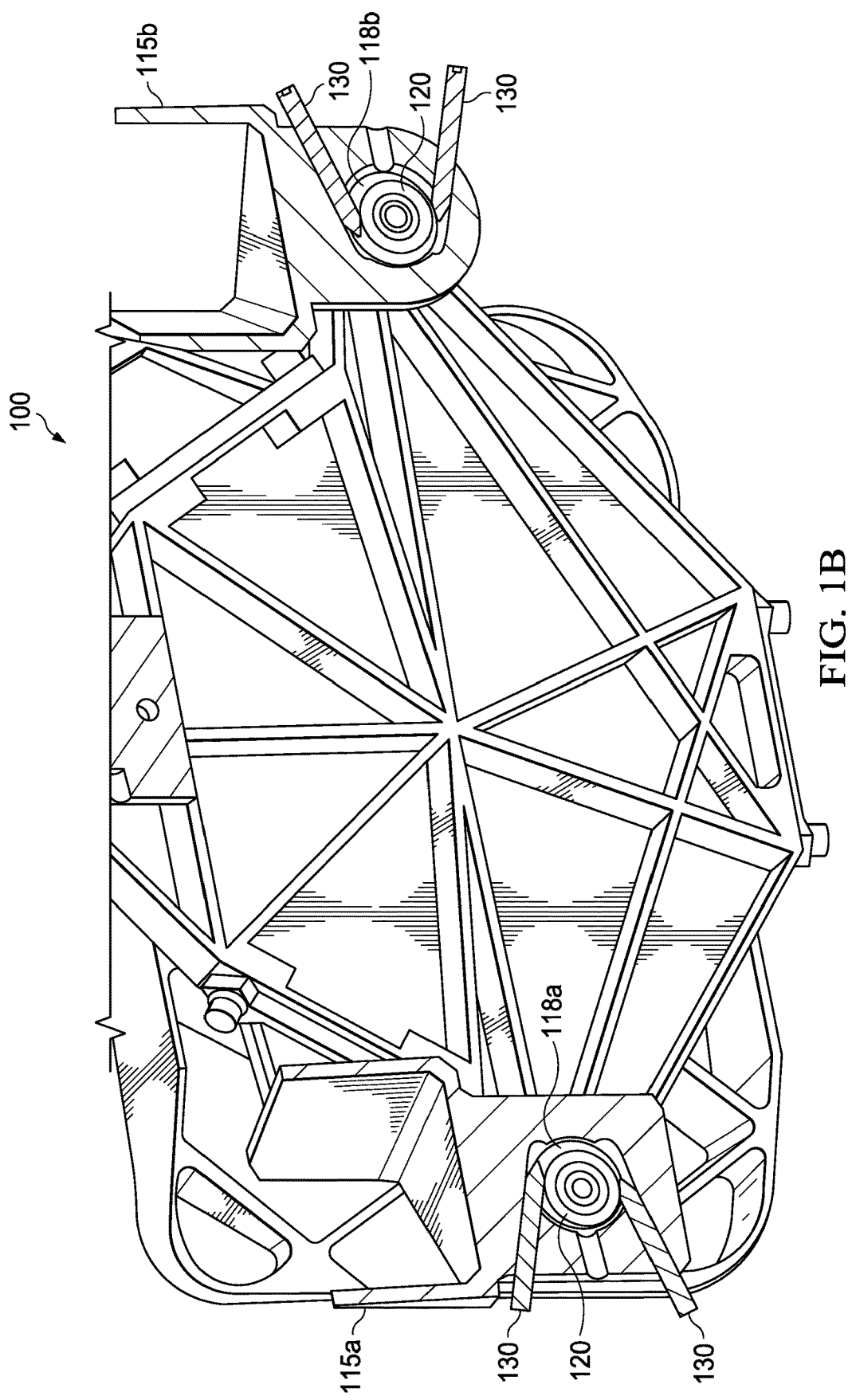

FIGS. 1A and 1B illustrate views of an example precision adjustable mounting system 100 according to this disclosure. In particular, FIG. 1A is a perspective view of the precision adjustable mounting system 100, and FIG. 1B is a sectional view of the precision adjustable mounting system 100. The embodiment of the system 100 shown in FIGS. 1A and 1B is for illustration only. Other embodiments of the system 100 could be used without departing from the scope of this disclosure.

In FIGS. 1A and 1B, the precision adjustable mounting system 100 is configured for use as a mount for an optical device such as a mirror assembly, although one or more other components could be mounted on the system 100. FIG. 1A shows the reverse side of the mount. As shown in FIG. 1A, the precision adjustable mounting system 100 includes a mirror 105, a support bracket 110, and multiple support fittings 115a-115c. Each of the support fittings 115a-115b includes a hole or void 118a-118b, an adjustment screw 120, a fixing nut 125, and multiple conical tip set screws 130. A third support fitting 115c includes a void (not shown), an adjustment screw 120, and a fixing nut 125.

The mirror 105 is one type of device that may be adjusted using the precision adjustable mounting system 100. Depending on the embodiment, the mirror 105 can include a substantially flat optical surface or a curved optical surface. In FIG. 1A, the optical surface of the mirror 105 is not shown but is opposite the support bracket 110. In some embodiments, the mirror 105 is approximately twelve inches (about 30 cm) across. In other embodiments, the mirror 105 could be larger or smaller.

The support bracket 110 is attached to a reverse side of the mirror 105 and provides a supportive structure between the mirror 105 and rest of the precision adjustable mounting system 100. Together, the mirror 105 and support bracket 110 for a mirror assembly. As shown in FIG. 1A, at least one surface of the support bracket 110 includes a structural webbed pattern that provides rigidity. In some embodiments, the support bracket 110 is formed of titanium, although other or additional suitable materials could be used.

Multiple support fittings 115a-115c connect the support bracket 110 to a base structure, device, or assembly (not shown). In some embodiments, the support fittings 115a-115c are bonded to the base structure, device, or assembly. Each support fitting 115a-115c includes a square U-shaped channel. In some embodiments, the square U-shaped channel of each support fitting 115a-115c fits over a square tube that is part of the base structure, device, or assembly. Of course, each support fitting 115a-115c could have any other suitable shape.

Each of the support fittings 115a-115b includes an oversized, elongated hole or void 118a-118b in the support fitting 115a-115b. In some embodiments, the voids 118a-118b are both oriented along a first axis such that the void 118a is substantially parallel to the void 118b. Each void 118a-118b is configured to receive one of the adjustment screws 120 and a portion of each conical tip set screw 130.

Each adjustment screw 120 is disposed through one of the voids 118a-118b into a screw hole (not shown) on the support bracket 110. The adjustment screw 120 is a compound screw that provides for fine adjustments while also providing robust locking capability. In some embodiments, the adjustment screw 120 includes a combination of multiple nested screws, washers, and at least one support structure. The outside diameter (OD) of each adjustment screw 120 is slightly smaller than the inside diameter (ID) of its respective void 118a-118b. The oversized void 118a-118b thus allows for adjustment of the adjustment screw 120 (and the support bracket 110) in one or more lateral directions relative to the support fitting 115a-115b. The adjustment screw 120 may have a standard slotted, Phillips, hex, or square head configured to receive a screwdriver. The adjustment screw 120 can be advanced further into (or backed out of) the void 118a-118b by rotation of the head with the screwdriver.

Each adjustment screw 120 is associated with a fixing nut 125. When tightened against the respective support fitting 115a-115b, the fixing nut 125 acts to hold the adjustment screw 120 in a lateral position relative to the support fitting 115a-115b.

Each adjustment screw 120 is also associated with two conical tip set screws 130 that are configured to move in or out of a screw hole in the support fitting 115a-115b. Fine adjustment of each adjustment screw 120 is provided by the associated conical tip set screws 130 as described in greater detail below. The two conical tip set screws 130 associated with each adjustment screw 120 are positioned at an angle with respect to each other. FIG. 1B is a sectional view through the support fittings 115a-115b. This view allows the conical tip set screws 130 to be seen more clearly. As shown in FIG. 1B, the two conical tip set screws 130 of the support fitting 115a are arranged as a mirror image of the two conical tip screw screws 130 of the support fitting 115b. Adjustments made to the adjustment screws 120 on both sides of the support bracket 110 using the conical tip set screws 130 allow for lateral and rotational adjustment of the mounted object.

Although FIGS. 1A and 1B illustrate one example of a precision adjustable mounting system 100, various changes may be made to FIGS. 1A and 1B. For example, as shown in FIG. 1A, the middle support fitting 115c includes an adjustment screw 120 but does not have conical tip set screws for fine adjustment. However, it will be understood that any support fitting may include zero, one, or multiple conical tip set screws 130 depending on particular needs. Also, the makeup and arrangement of the precision adjustable mounting system 100 are for illustration only. Components could be added, omitted, combined, or placed in any other configuration according to particular needs.

Figure 2:
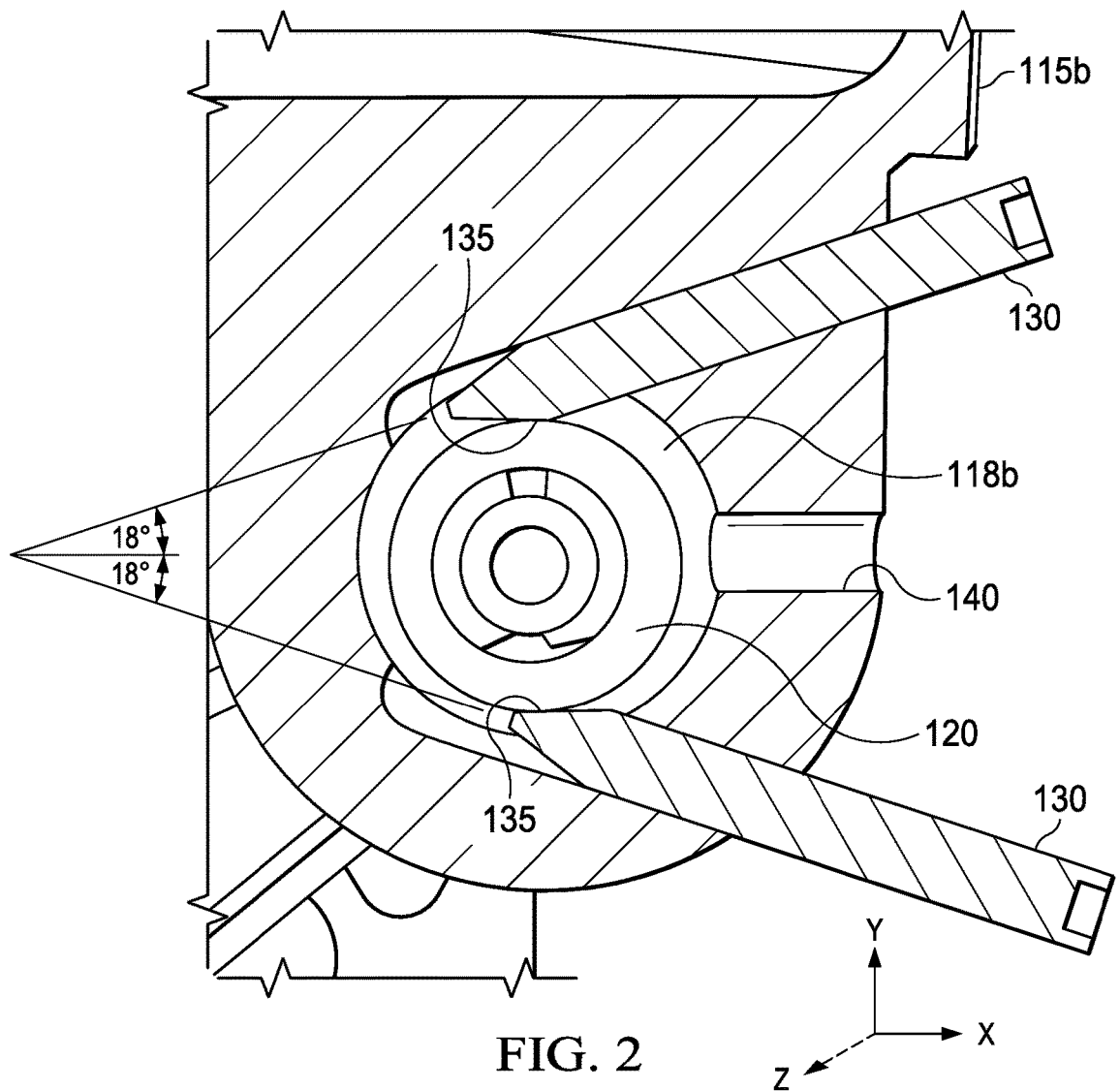
FIG. 2 illustrates a magnified view of a portion of the precision adjustable mounting system of FIGS. 1A and 1B according to this disclosure.

FIG. 2 illustrates a magnified view of a portion of the precision adjustable mounting system 100 of FIGS. 1A and 1B according to this disclosure. Specifically, FIG. 2 illustrates the support fitting 115b in greater detail. It will be understood that some or all of the details described below may also apply to the support fittings 115a, 115c. For ease of explanation, X, Y, and Z axes are shown in FIG. 2 to provide a reference for different directions and dimensions. However, the arrangement of the X, Y, and Z axes is merely one example, and it will be understood that the X, Y, and Z axes could be oriented differently.

As shown in FIG. 2, the adjustment screw 120 and the oversized elongate void 118b are oriented in the Z direction (substantially perpendicular to the page). Movement of the adjustment screw 120 in or out of the void 118b provides an adjustment in the Z direction of the object or structure to which the adjustment screw 120 is coupled (such as the support bracket 110). As described earlier, the void 118b is oversized relative to the adjustment screw 120. In some embodiments, the adjustment screw 120 has an OD of approximately 0.945 inches (about 2.4 cm), and the void 118b has an ID of approximately 1.20 inches (about 3.05 cm). Because of the difference in size between the adjustment screw 120 and the void 118b, the X and Y positions of the adjustment screw 120 can be adjusted within the void 118b.

Adjustment of the adjustment screw 120 in the Y direction is performed using the two conical tip set screws 130. As shown in FIG. 2, each set screw 130 includes a narrow angle convex cone tip. Each conical tip set screw 130 extends from an opening in an outer surface of the support fitting 115b through a threaded screw hole into the void 118b. Each conical tip set screw 130 may have a standard slotted, Phillips, hex, or square head configured to receive a screwdriver. Each conical tip set screw 130 can be advanced further into (or backed out of) the void 118b by rotation of the head with the screwdriver. The conical tip of each set screw 130 is configured to contact the adjustment screw 120 at a tangent point 135. The two tangent points 135 are substantially opposite each other across a diameter of the adjustment screw 120. The conical tip set screws 130 are positioned at an angle to each other and to the X axis. The conical tip set screws 130 are co-planar with each other and with the X-Y plane. That is, the X-Y plane bisects both set screws 130 as shown by the sectional view of FIG. 2.

The conical angle of each tip and the angle of the set screws 130 with respect to the X axis are related such that the conical edge of the upper set screw 130 at its tangent point 135 is substantially parallel to the conical edge of the lower set screw 130 at its tangent point 135. That is, the conical edges of the set screws 130 form substantially parallel "rails" tangent to the adjustment screw 120. The parallel edges guide adjustment of the adjustment screw 120 in the X direction, as described in greater detail below. In addition, the set screws 130 can be advanced or retracted in order to move the "Y" position of the parallel edges, thereby causing movement of the adjustment screw 120 in the "Y" direction, as described in greater detail below. The substantially parallel relationship between the conical edges of the set screws 130 is maintained as either or both set screws 130 are advanced or retracted. In some embodiments, the angle formed between the X axis and the center axis of each conical tip set screw 130 is approximately 18 degrees. In some embodiments, the conical tip set screws 130 have an OD of approximately 0.25 inches (about 0.64 cm).

In FIG. 2, the adjustment screw 120 is slightly below center (negative Y direction) of the void 118b. This is achieved by advancing the upper set screw 130 (shown in FIG. 2 as further advanced into the void 118b) and retracting the lower set screw 130 (shown in FIG. 2 as less advanced in the void 118b). Advancing or retracting each set screw 130 changes the Y position of the tangent conical edge of the set screw 130. This in turn changes the Y position of the adjustment screw 120. Generally, the two set screws 130 should be advanced and retracted by the same amount in order to maintain a constant distance between the substantially parallel rails and to maintain contact with the adjustment screw 120. That is, to move the adjustment screw 120, one set screw 130 is advanced by x distance, and the other set screw 130 is retracted by x distance.

Due to the angle of the set screws 130 with respect to the X axis, for every 1 mil that a set screw 130 advances, the adjustment screw 120 only moves 0.5 mil or less. This is beneficial in systems where adjustments of 1 mil or less is needed. Based on the dimensions described above, an adjustment of the adjustment screw 120 in the Y direction over a range of approximately 0.125 inches (about 0.32 cm) can be achieved. Anywhere within this adjustment range, the conical tip of each set screw 130 remains in contact with the cylindrical surface of the adjustment screw 120. Because each set screw 130 threads smoothly through the screw hole to support and nudge the adjustment screw 120, no strain forces or sudden adjustment slips are created.

Figure 3:
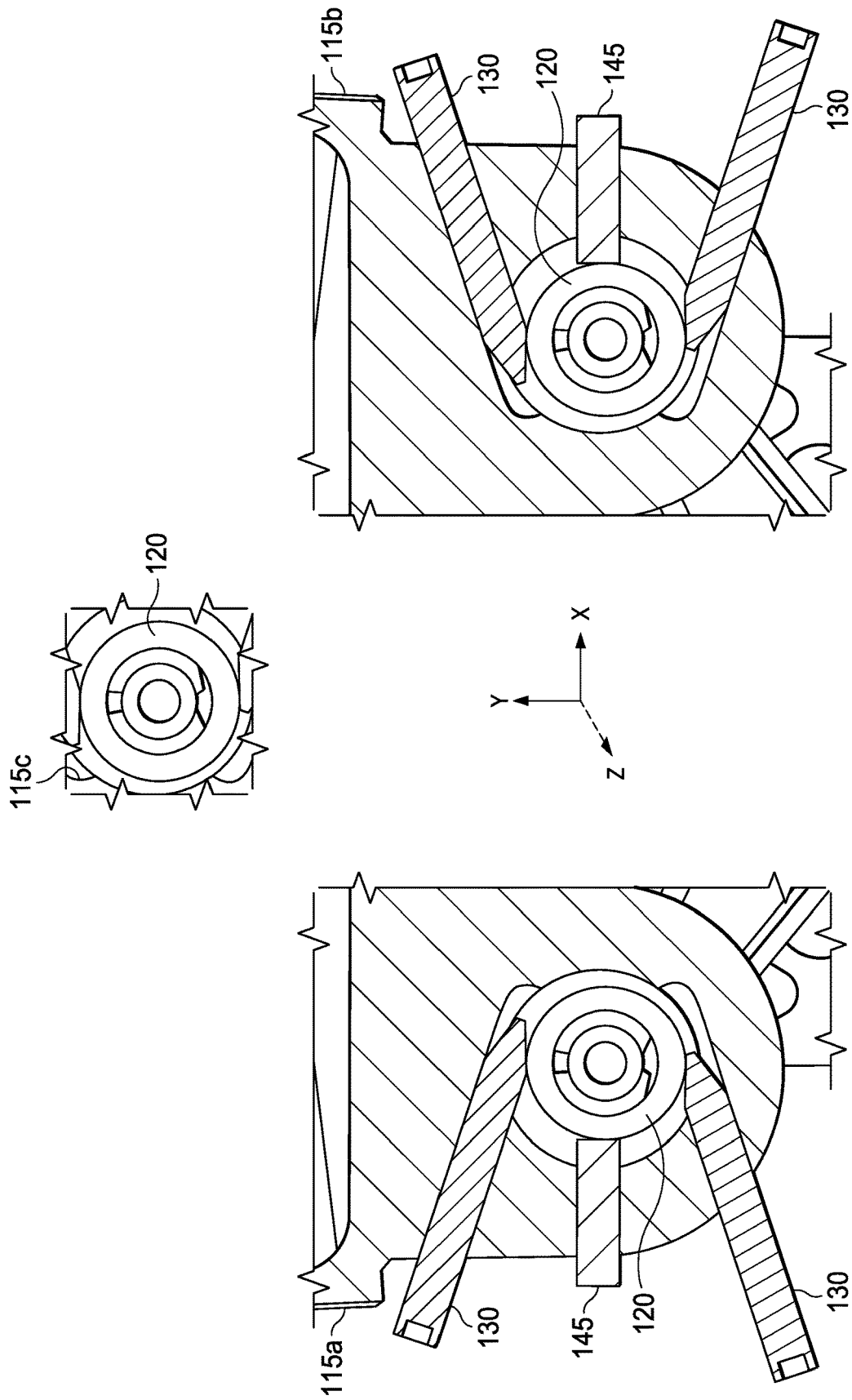
FIG. 3 illustrates six degrees of freedom attainable with the precision adjustable mounting system of FIGS. 1A and 1B according to this disclosure.

As shown in FIG. 2, the support fitting 115b also includes a screw hole 140 configured to accept a standard flat tip set screw 145 (shown in FIG. 3). When installed in the screw hole 140, the flat tip set screw 145 is configured to contact the adjustment screw 120. The flat tip set screw 145 provides adjustment of the adjustment screw 120 in the X direction by advancing into or retracting out of the void 118b.

In some embodiments, one of the conical tip set screws 130 could be replaced with a spring mounted set pin. In such embodiments, the support fitting 115b would include the adjustment screw 120, one conical tip set screw 130, and a spring mounted set pin. In operation, as the one conical tip set screw 130 is backed out, the spring of the set pin pushes the set pin forward, and the set pin pushes the adjustment screw 120 toward the retracting set screw 130.

The arrangement of the conical tip set screws 130 as shown in FIG. 2 provides another advantage over other adjustment mechanisms. Since the conical tip set screws 130 are installed and manipulated from a side position near the screw hole 140, it is possible to make Y axis adjustments in tight or closed spaces where set screws oriented along the Y axis would not be accessible.

Although FIG. 2 illustrates a magnified view of a portion of the precision adjustable mounting system 100 of FIGS. 1A and 1B, various changes may be made to FIG. 2. For example, the makeup and arrangement of the precision adjustable mounting system 100 are for illustration only. Components could be added, omitted, combined, or placed in any other configuration according to particular needs.

FIG. 3 illustrates six degrees of freedom attainable with the precision adjustable mounting system 100 of FIGS. 1A and 1B according to this disclosure. For ease of explanation, various components of the system 100 are not shown in FIG. 3.

In FIG. 3, the system 100 is shown with two flat tip set screws 145 installed in the screw holes 140 of the support fittings 115a-115b. The set screws 145 are oriented in the X direction. Each of the three support fittings 115a-115c includes one adjustment screw 120. The combination of all three Z axis oriented adjustment screws 120 provides the lateral Z degree of freedom and rotational X and rotational Y degrees of freedom for the support bracket 110 and mirror 105. The four set screws 130 (two on the support fitting 115a and two on the support fitting 115b) together provide the lateral Y degree of freedom. The two X-axis set screws 145 provide the lateral X degree of freedom. The combination of all six set screws (four conical tip set screws 130 and two flat tip set screws 145) provides the rotational Z degree of freedom.

Although FIG. 3 illustrates six degrees of freedom attainable with the precision adjustable mounting system 100 of FIGS. 1A and 1B, various changes may be made to FIG. 3. For example, as noted above, the labeling of the X, Y, and Z axes is for illustration only.

Figure 4:
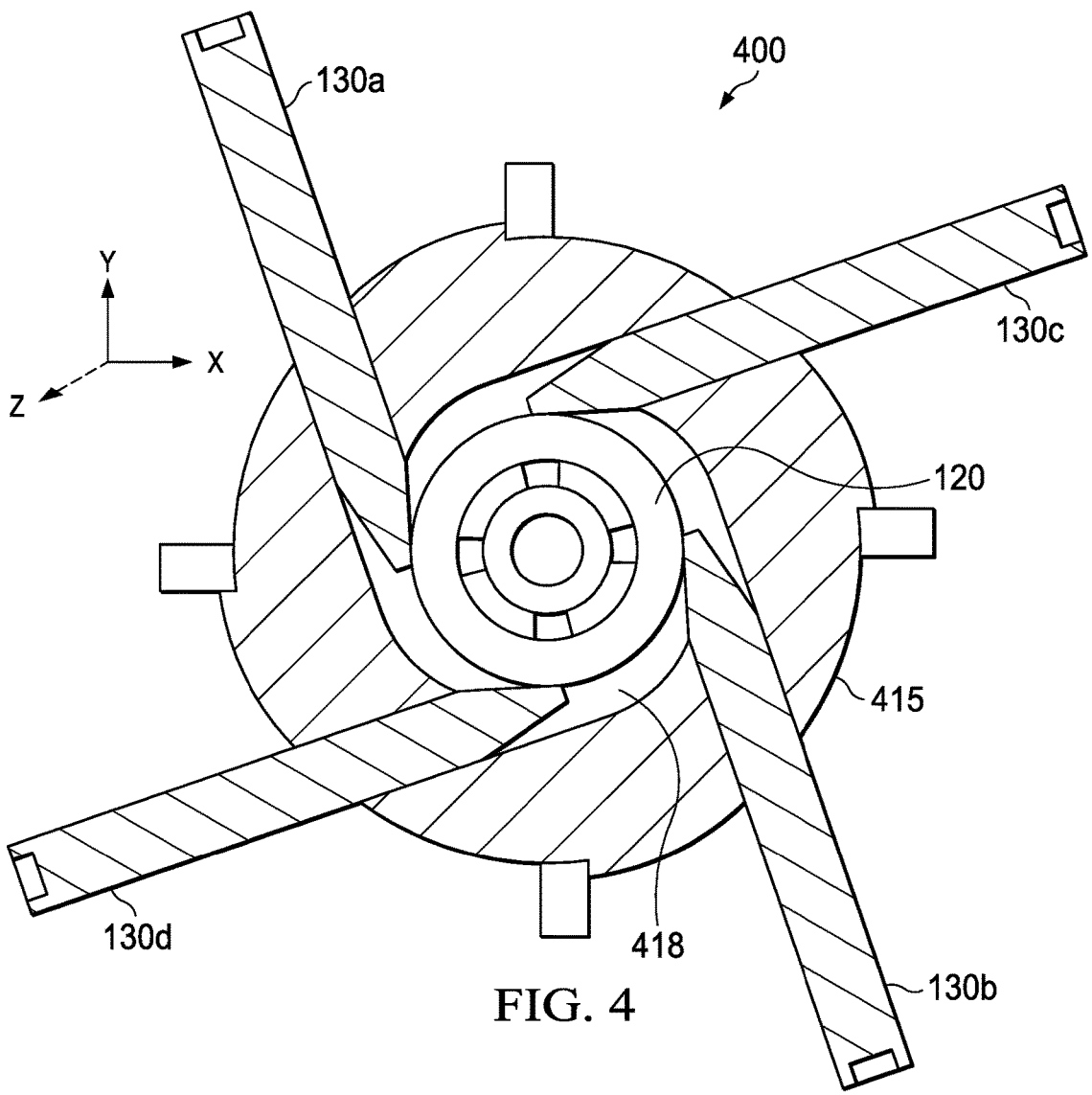
FIG. 4 illustrates another example of a precision adjustable mounting system using conical tip set screws according to this disclosure.

FIG. 4 illustrates another example of a precision adjustable mounting system 400 using conical tip set screws according to this disclosure. The system 400 represents a simple two-degree-of-freedom adjustable mount. The embodiment of the system 400 shown in FIG. 4 is for illustration only. Other embodiments of the system 400 could be used without departing from the scope of this disclosure.

In FIG. 4, the system 400 includes a single support fitting 415. The support fitting 415 includes an oversized, elongated hole or void 418 and an adjustment screw 120 oriented in the Z direction. The system 400 also includes four conical tip set screws 130a-130d arranged radially around the adjustment screw 120 at approximately 90° intervals. The set screws 130a-130b have substantially parallel conical edges and provide adjustment of the adjustment screw 120 in the X direction. The set screws 130c-130d also have substantially parallel conical edges and provide adjustment of the adjustment screw 120 in the Y direction. In contrast to the pairs of set screws 130 arranged at an angle to each other (as shown in FIG. 2), the associated pairs of set screws 130a-130b and 130c-130d are substantially parallel and are installed from opposites sides of the support fitting 415. However, adjustment of the adjustment screw 120 is performed in a manner similar to that described in FIG. 2 by advancing one set screw in a pair and retracting the other set screw in the pair.

Although FIG. 4 illustrates another example of a precision adjustable mounting system 400 using conical tip set screws, various changes may be made to FIG. 4. For example, the makeup and arrangement of the precision adjustable mounting system 400 are for illustration only. Components could be added, omitted, combined, or placed in any other configuration according to particular needs.

Figure 5:
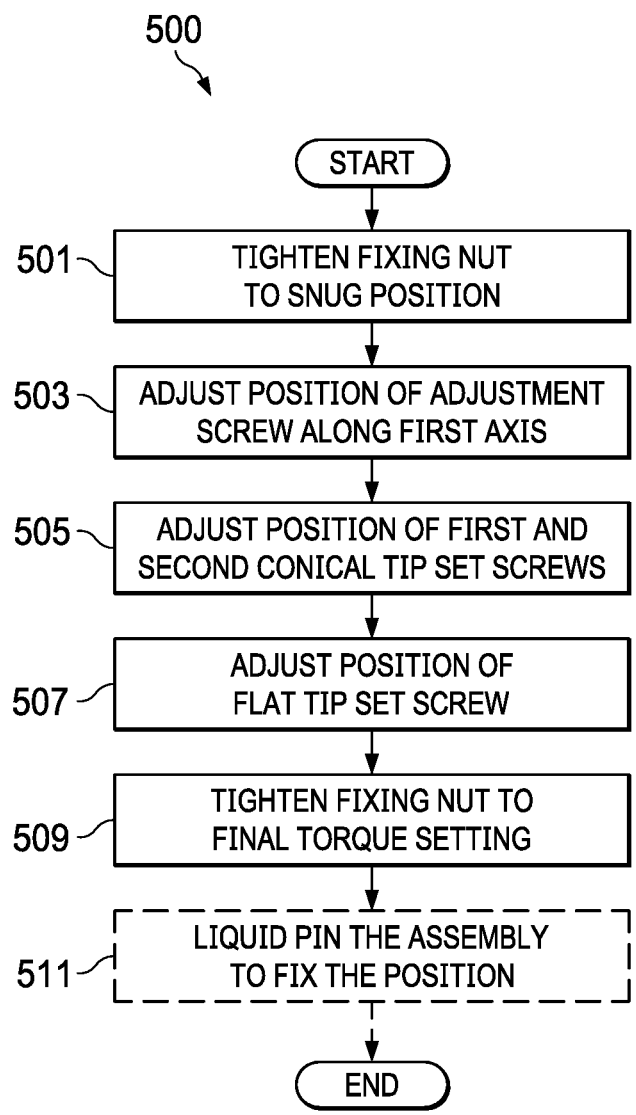
FIG. 5 illustrates an example method for precision adjustment of a device according to this disclosure.

FIG. 5 illustrates an example method 500 for precision adjustment of a device according to this disclosure. The method 500 may be performed using one or more of the systems shown in FIGS. 1A through 4, such as the precision adjustable mounting system 100 of FIGS. 1A and 1B. However, the method 500 could be used with any other suitable system.

At step 501, a user (such as an operator or engineer) tightens a fixing nut to a snug but not tight position. This may include, for example, the user tightening the fixing nut 125 at one or more of the support fittings 115a-115c. The snug position allows fine position adjustment of an adjustment screw associated with the fixing nut without slippage or other unwanted movement.

At step 503, the user adjusts a position along a first axis of an adjustment screw disposed within a void of a support fitting. This may include, for example, the user using a screwdriver to advance or retract the adjustment screw 120 along the Z axis at one or more of the support fittings 115a-115c.

At step 505, the user adjusts a position of first and second conical tip set screws coupled to the support fitting. This may include, for example, the user using a screwdriver to advance one of the conical tip set screws 130 and retract another one of the conical tip set screws at one or more of the support fittings 115a-115b. Adjustment of the position of each of the first and second set screws causes an adjustment of a position of the adjustment screw along a second axis (such as the Y axis) substantially perpendicular to the first axis.

At step 507, the user adjusts a position of a flat tip set screw coupled to the support fitting. This may include, for example, the user using a screwdriver to advance or retract a flat tip set screw 145 at one or more of the support fittings 115a-115b. Adjustment of the flat tip set screw causes an adjustment of a position of the adjustment screw along a third axis (such as the X axis) substantially perpendicular to the first axis.

At step 509, the user tightens the fixing nut further to a final torque setting. The tightened fixing nut tightens the whole assembly (including the support fitting) to a final position that is resistant to movement due to vibration or high lateral forces.

In some embodiments, at step 511, after adjustment is completed, the assembly (the support fitting, the adjustment screw, and the set screws) can be "liquid pinned" in place for even greater security. To liquid pin, a user injects epoxy or other material into the void through one or more injection holes connected to the void. The epoxy or other material then hardens, and the position of the support fitting is fixed.

Although FIG. 5 illustrates one example of a method 500 for precision adjustment of a device, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

As described above, the disclosed embodiments provide the use of conical tip set screws in conjunction with adjustment screws. The disclosed arrangement of conical tip set screws provide a combination of (1) smooth surfaces to push on with low contact stress, (2) opposing parallel "rails" to provide precise motion in an orthogonal direction, and (3) adjustment resolution that is much finer (such as approximately three times finer) than the thread pitch of the set screw due to the cone angle. This provides fine linear motion with a simple design. Also, using a combination of multiple adjustment screws and associated conical tip set screws provides six degrees of freedom of adjustment. Such a design can be implemented in flight hardware for essentially no added weight (versus other designs that require multiple linear, tip-tilt, or rotation stages in series).

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for multiple degree of freedom precision adjustable mounting, the apparatus comprising:
   a support fitting having a void oriented along a first axis;
   an adjustment screw disposed within the void; and
   first and second set screws coupled to the support fitting, each set screw having a substantially conical tip;
   wherein the first and second set screws are oriented such that a plane bisecting the first and second set screws is substantially perpendicular to the first axis; and
   wherein an edge of the tip of the first set screw is substantially parallel to an edge of the tip of the second set screw such that the edges of the tips form substantially parallel rails tangent to the adjustment screw.

2. The apparatus of claim 1, wherein:
   the edge of the tip of the first set screw is configured to contact a first point of the adjustment screw; and
   the edge of the tip of the second set screw is configured to contact a second point of the adjustment screw diametrically opposite the first point.

3. The apparatus of claim 2, wherein the first point and the second point form a line along a second axis substantially perpendicular to the first axis.

4. The apparatus of claim 3, wherein the first and second set screws are configured to adjust a position of the adjustment screw along the second axis by adjusting positions of the tips of the first and second set screws within the void.

5. The apparatus of claim 4, further comprising:
   a third set screw coupled to the support fitting, the third set screw oriented along a third axis substantially perpendicular to the first and second axes, the third set screw configured to contact a third point of the adjustment screw.

6. The apparatus of claim 3, wherein the first and second set screws are oriented at an angle with respect to each other, the angle associated with an angle of each of the tips of the first and second set screws.

7. An apparatus for multiple degree of freedom precision adjustable mounting, the apparatus comprising:
   a support fitting having a void oriented along a first axis;
   an adjustment screw disposed within the void;
   first and second set screws coupled to the support fitting, each set screw having a substantially conical tip, wherein:
      the first and second set screws are oriented such that a plane bisecting the first and second set screws is substantially perpendicular to the first axis;
      an edge of the tip of the first set screw is substantially parallel to an edge of the tip of the second set screw;
      the edge of the tip of the first set screw is configured to contact a first point of the adjustment screw, and the edge of the tip of the second set screw is configured to contact a second point of the adjustment screw diametrically opposite the first point;
      the first point and the second point form a line along a second axis substantially perpendicular to the first axis; and
      the first and second set screws are configured to adjust a position of the adjustment screw along the second axis by adjusting positions of the tips of the first and second set screws within the void;
   a third set screw coupled to the support fitting, the third set screw oriented along a third axis substantially perpendicular to the first and second axes, the third set screw configured to contact a third point of the adjustment screw; and
   a fixing nut coupled to the adjustment screw, the fixing nut configured to be tightened against the support fitting and hold the adjustment screw in a position along the second or third axis relative to the support fitting.

8. A system for multiple degree of freedom precision adjustable mounting, the system comprising:
   first and second support fittings, each support fitting having a void oriented along a first axis, each support fitting comprising:
      an adjustment screw disposed within the respective void; and
      first and second set screws coupled to the respective support fitting, each set screw having a substantially conical tip, wherein the first and second set screws are oriented such that a plane bisecting the first and second set screws is substantially perpendicular to the first axis, and wherein an edge of the tip of the first set screw is substantially parallel to an edge of the tip of the second set screw;
   wherein the first and second set screws coupled to the first support fitting are oriented in a pattern that is a mirror image of the first and second set screws coupled to the second support fitting.

9. The system of claim 8, wherein, for each support fitting:
   the edge of the tip of the first set screw is configured to contact a first point of the adjustment screw; and
   the edge of the tip of the second set screw is configured to contact a second point of the adjustment screw diametrically opposite the first point.

10. The system of claim 9, wherein, for each support fitting, the first point and the second point form a line along a second axis substantially perpendicular to the first axis.

11. The system of claim 10, wherein, for each support fitting, the first and second set screws are configured to adjust a position of the adjustment screw along the second axis by adjusting positions of the tips of the first and second set screws within the void.

12. The system of claim 11, wherein each support fitting further comprises:
   a third set screw coupled to the respective support fitting, the third set screw oriented along a third axis substantially perpendicular to the first and second axes, the third set screw configured to contact a third point of the respective adjustment screw.

13. The system of claim 12, wherein each support fitting further comprises:
   a fixing nut coupled to the respective adjustment screw, the fixing nut configured to be tightened against the respective support fitting and hold the respective adjustment screw in a position along the second or third axis relative to the respective support fitting.

14. The system of claim 10, wherein, for each support fitting, the first and second set screws are oriented at an angle with respect to each other, the angle associated with an angle of each of the tips of the first and second set screws.

15. The system of claim 10, further comprising:
   a third support fitting having a void oriented along the first axis and an adjustment screw disposed within the void.

16. A method for multiple degree of freedom precision adjustable mounting, the method comprising:
   adjusting a position along a first axis of an adjustment screw disposed within a void of a support fitting, the void oriented along the first axis; and adjusting a position of each of first and second set screws coupled to the support fitting, each set screw having a substantially conical tip;

wherein the first and second set screws are oriented such that a plane bisecting the first and second set screws is substantially perpendicular to the first axis; and wherein an edge of the tip of the first set screw is substantially parallel to an edge of the tip of the second set screw such that the edges of the tips form substantially parallel rails tangent to the adjustment screw.

17. The method of claim 16, wherein adjusting the position of each of the first and second set screws causes an adjustment of a position of the adjustment screw along a second axis substantially perpendicular to the first axis.

18. The method of claim 17, wherein:

the edge of the tip of the first set screw is configured to contact a first point of the adjustment screw; and the edge of the tip of the second set screw is configured to contact a second point of the adjustment screw diametrically opposite the first point.

19. The method of claim 16, wherein adjusting the position of each of the first and second set screws comprises:

advancing a position of the tip of one of the first and second set screws within the void and retracting a position of the tip of the other of the first and second set screws within the void.

20. A method for multiple degree of freedom precision adjustable mounting, the method comprising:

adjusting a position along a first axis of an adjustment screw disposed within a void of a support fitting, the void oriented along the first axis;

adjusting a position of each of first and second set screws coupled to the support fitting, each set screw having a substantially conical tip;

tightening a fixing nut to a snug but not tight position before adjusting the positions of the adjustment screw, the first set screw, and the second set screw; and tightening the fixing nut further to a final torque setting after adjusting the positions of the adjustment screw, the first set screw, and the second set screw;

wherein the first and second set screws are oriented such that a plane bisecting the first and second set screws is substantially perpendicular to the first axis; and wherein an edge of the tip of the first set screw is substantially parallel to an edge of the tip of the second set screw.

\* \* \* \* \*